United States Patent [19]

Cook et al.

[11] Patent Number: 4,891,910
[45] Date of Patent: Jan. 9, 1990

[54] APPARATUS FOR SEALING A DOOR

[75] Inventors: Thomas G. Cook, Fairview; Conrad J. Geibel, Jr., Erie, both of Pa.

[73] Assignee: American Sterilizer Company, Erie, Pa.

[21] Appl. No.: 292,280

[22] Filed: Dec. 30, 1988

[51] Int. Cl.$^4$ ............................................. E05C 9/00
[52] U.S. Cl. ...................................... 49/395; 49/506; 220/315; 292/6
[58] Field of Search ............... 49/395, 400, 402, 13, 49/485, 506; 220/315; 292/6

[56] References Cited

U.S. PATENT DOCUMENTS

| | | | |
|---|---|---|---|
| 3,173,572 | 3/1965 | Beecher | 220/315 X |
| 3,539,215 | 11/1970 | Lauterbach | 220/315 X |
| 3,694,145 | 9/1972 | Stevens | 49/395 X |
| 4,543,748 | 10/1985 | North, Jr. | 292/6 X |

FOREIGN PATENT DOCUMENTS 1016570  8/1977  Canada .................................. 49/395
2317289  12/1973  Fed. Rep. of Germany ........ 49/395

*Primary Examiner*—Philip C. Kannan
*Attorney, Agent, or Firm*—Kirkpatrick & Lockhart

[57] ABSTRACT

An apparatus for sealing a door of a chamber, the chamber being of the type wherein the door is urged into engagement with the chamber upon rotation of a locking wheel and having a seal positioned between the door and the chamber such that upon movement of the door toward the chamber the seal is compressed, comprises a motor for providing torque to the locking wheel for urging the door toward the chamber. A current source supplies current to the motor. A circuit monitors the current supplied to the motor to determine if a desired degree of pressure between the seal and the chamber has been achieved based on the amount of current drawn by the motor. The current source is responsive to the monitoring circuit so as to end the supply of current to the motor when the desired degree of pressure is achieved.

6 Claims, 2 Drawing Sheets

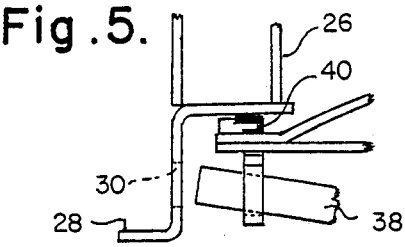
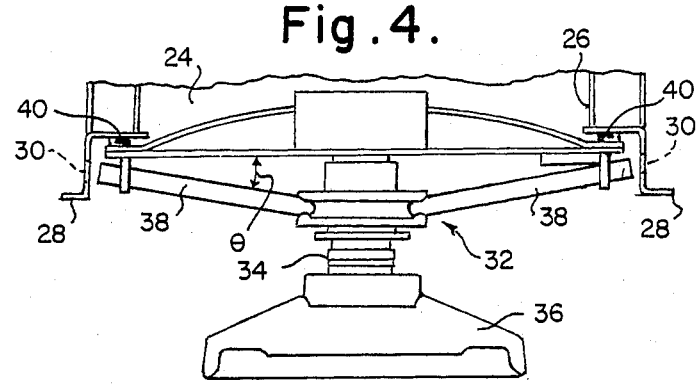
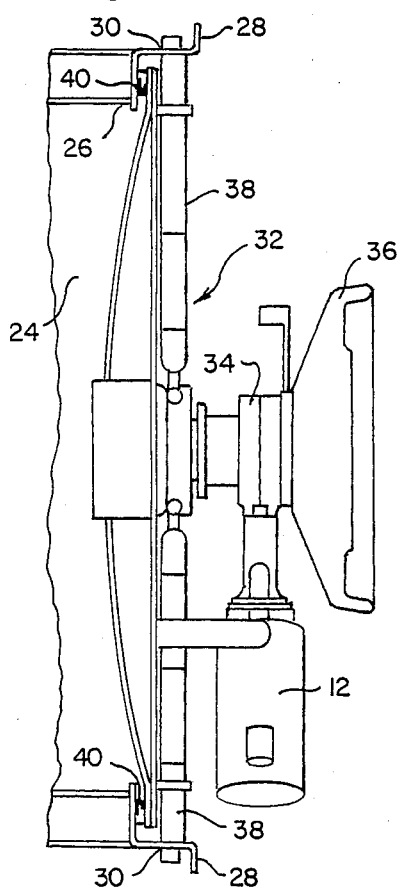
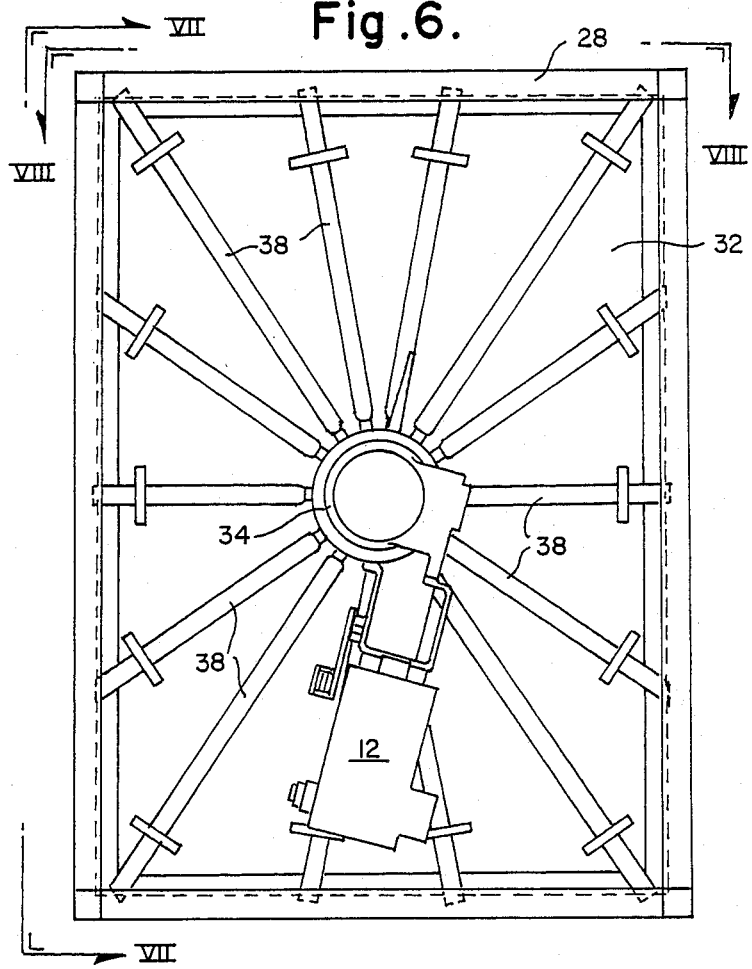
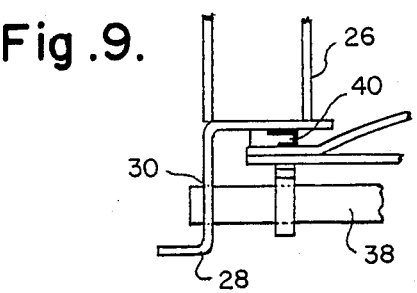
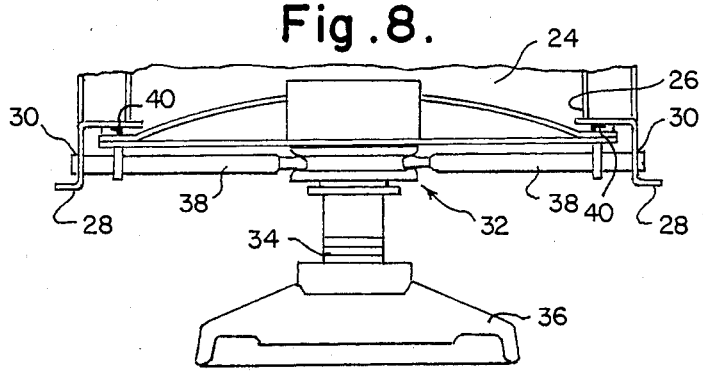

APPARATUS FOR SEALING A DOOR

BACKGROUND OF THE INVENTION

1. Field of the Invention

The present invention is directed broadly to apparatus for ensuring the closure of a door and more particularly to apparatus for sealing a door.

2. Description of the Prior Art

In many applications it is desirable to have a chamber door sealingly engage a chamber. Sterilization chambers represent one such application. In a sterilization chamber, a gasket is positioned between the door and an end ring of the chamber. It is critical that the door be sealed such that the gasket contacts the sterilizer end ring with an adequate amount of pressure so that the door will not leak when the chamber is pressurized for a sterilization operation. Typically, a sterilization chamber door must be sealed to approximately thirty-five to forty pounds of force to prevent the door from leaking.

Currently, the distance between the door and the chamber end ring is used to determine if the gasket is compressed to a desired degree. Limit switches are provided which indicate when the distance between the door and the end ring is correct. At that distance, the gasket should be sufficiently compressed such that the desired amount of pressure exists between the gasket and the end ring. However, the gasket compresses with time and age such that the desired amount of pressure is not achieved by the former position of the door with respect to the end ring. The distance between the door and the end ring must be decreased to achieve the same amount of pressure between the gasket and the end ring. That necessitates repositioning the limit switches.

Thus, the need exists for an inexpensive apparatus which determines if a chamber door is properly sealed based on the amount of pressure exerted by the gasket upon the chamber end ring and not based on the position of the door with respect to the chamber end ring.

SUMMARY OF THE PRESENT INVENTION

The present invention is directed to an apparatus for sealing a door of a chamber, the chamber being of the type wherein the door is urged into engagement with the chamber upon rotation of a locking wheel. The chamber further has a seal positioned between the door and the chamber such that upon movement of the door toward the chamber the seal is compressed. The apparatus comprises a motor for providing torque to the locking wheel for urging the door toward the chamber. A current source supplies current to the motor. A circuit monitors the current supplied to the motor to determine if a desired degree of pressure between the seal and the chamber has been achieved based on the amount of current drawn by the motor. The current source is responsive to the monitoring circuit so as to end the supply of current to the motor when the desired degree of pressure is achieved.

According to one embodiment of the present invention, the monitoring circuit includes a current sensor for producing an input signal and a comparator responsive to the input signal and a reference signal. The reference signal is representative of the current needed for the motor to deliver sufficient torque to establish a desired pressure of approximately forty pounds between the seal and the chamber. When the input signal equals the reference signal, the supply of current to the motor is shut off.

The present invention is also directed to a chamber having a door and an apparatus for ensuring the closure of the door, comprising a chamber having one end having an opening therein. A plurality of apertures are positioned along the perimeter of the opening. A door is sized to fit the opening of the chamber. A central wheel is rotatably carried by the door. A plurality of arms is carried by the door and connected to the central wheel such that upon rotation of the central wheel the plurality of arms move radially to engage the plurality of apertures, the degree of engagement being determinative of the distance between the door and the one end of the chamber. A seal is positioned between the door and the one end with the seal being compressed as the distance between the door and the one end decreases. A motor provides torque to the central wheel for urging the door toward the one end. A source of current supplies current to the motor. A circuit monitors the current supplied to the motor to determine if a desired degree of pressure between the seal and the one end of the chamber has been achieved based on the amount of current drawn by the motor. The current supplied to the motor is cut off when the desired degree of pressure is achieved.

The present invention also includes a method of ensuring the closure of a chamber door, the chamber being of the type wherein the door is urged into engagement with the chamber upon rotation of a locking wheel. The chamber further has a seal positioned between the door and the chamber such that upon movement of the door toward the chamber the seal is compressed. The method is comprised of the following steps: supplying current to a motor; coupling torque from the motor to the locking wheel for urging the door toward the chamber; monitoring the current supplied to the motor to determine if a desired degree of pressure between the seal and the chamber has been achieved based on the amount of current drawn by the motor; and ending the supplying of current to the motor when the desired degree of pressure is achieved.

The present invention permits the positioning of the door gasket to the end ring to be automatically changed thus ensuring the proper pressure exists between the gasket and the end ring regardless of the condition of the gasket. The present invention provides an indication that a chamber door is properly sealed which does not rely upon the position of the door or limit switches. The present invention therefore reduces factory setup time and eliminates the need for service calls to reset limit switches. It also increases motor life and reliability. Those and other advantages and benefits of the present invention will become apparent from the Description of a Preferred Embodiment hereinbelow.

BRIEF DESCRIPTION OF THE DRAWINGS

In order for the present invention to be easily understood and readily practiced, it will be described, by way of example only, with reference to the following figures wherein:

FIG 2 through 5 illustrate the chamber end ring and the door in a closed a position; and FIGS. 6 through 5 illustrate the chamber end ring and the door in a closed and unlocked position.

DESCRIPTION OF A PREFERRED EMBODIMENT

Figure 1:
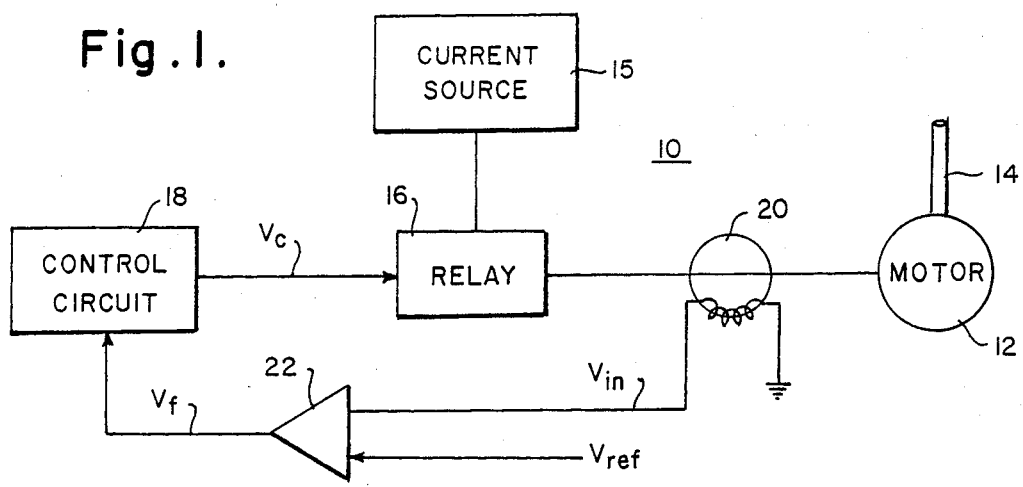
FIG. 1 is a block diagram of an apparatus for sealing a door of a chamber constructed according to the teachings of the present invention.

In FIG. 1, a block diagram of an apparatus 10 for sealing a door of a chamber constructed according to the teachings of the present invention is illustrated. In FIG. 1, a motor 12 provides torque which can be coupled through a shaft 14 to a door closing mechanism not shown in FIG. 1. The motor receives current from a current source 15 through a switching relay 16. The operation of the relay 16 is controlled by a control circuit 18. The control circuit 18 produces a control signal $V_c$ which is input to the relay 16. The control signal $V_c$ determines whether the relay contacts (not shown) are closed so as to conduct power from the current source 15 to the motor 12. The supply of current to a motor through a switching relay which is controlled by a control circuit is believed to be well-known in the art. Therefore, no further description of that portion of the circuit shown in FIG. 1 is believed necessary.

In FIG. 1, a current sensor 20 produces an input signal $V_{in}$ which is representative of the level of current drawn by the motor 12 from the current source 15. The input signal $V_{in}$ is input to a comparator 22. The comparator 22 also receives a reference signal $V_{ref}$. The comparator 22 produces a feedback signal $V_f$ which is input to the control circuit 18. The feedback signal $V_f$ may, in one example, have two states, a high state and a low state. When the input signal $V_{in}$ equals the reference signal $V_{ref}$, the state of the feedback signal $V_f$ changes. In that manner, an indication is provided to the control circuit 18 that the level of current drawn by the motor 12 is equal to the level of current represented by the reference signal $V_{ref}$. The control circuit 18 may then take appropriate action which may include opening the contacts of the switching relay 16.

According to one embodiment of the present invention, the functions of the current sensor 20 and comparator 22 may be provided by a current operated switch such as that available from the Neilsen-Kuljian Company.

The amount of torque supplied by the motor 12 can be measured indirectly by measuring the current drawn by the motor 12 because the torque/current relationship for the motor 12 is known from the manufacturer's data. Thus, the setting for the current switch, i.e. selection of the value for the reference signal $V_{ref}$, is the current value which produces the desired value of torque. The desired value of torque is that value which, after mechanical transformation, produces a desired amount of pressure between the seal and the chamber. When the current drawn by the motor 12 reaches that predetermined level, the switch is activated. If the aforementioned Neilsen-Kuljian current switch is used, the feedback signal $V_f$ changes state from a high to a low value when the predetermined current value is reached. Because the motor 12 is shut-off when the desired torque has been applied, the apparatus 10 operates in a manner which is independent of the actual position of the door. Thus, limit switches currently used to indicate the position of the door are eliminated.

Figure 3:
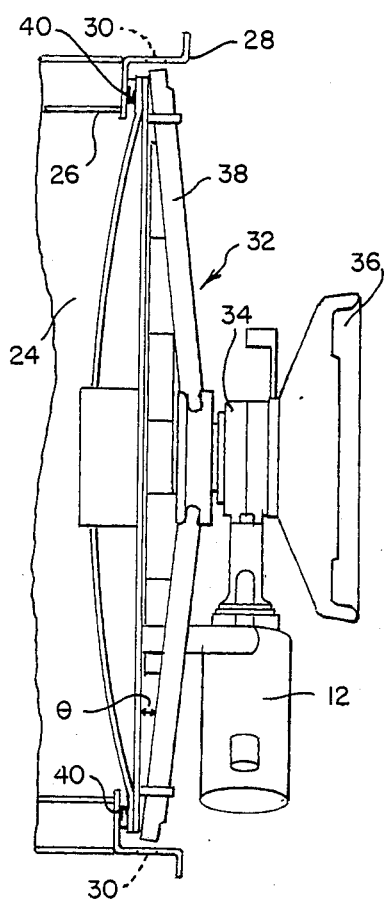
Figure 2:
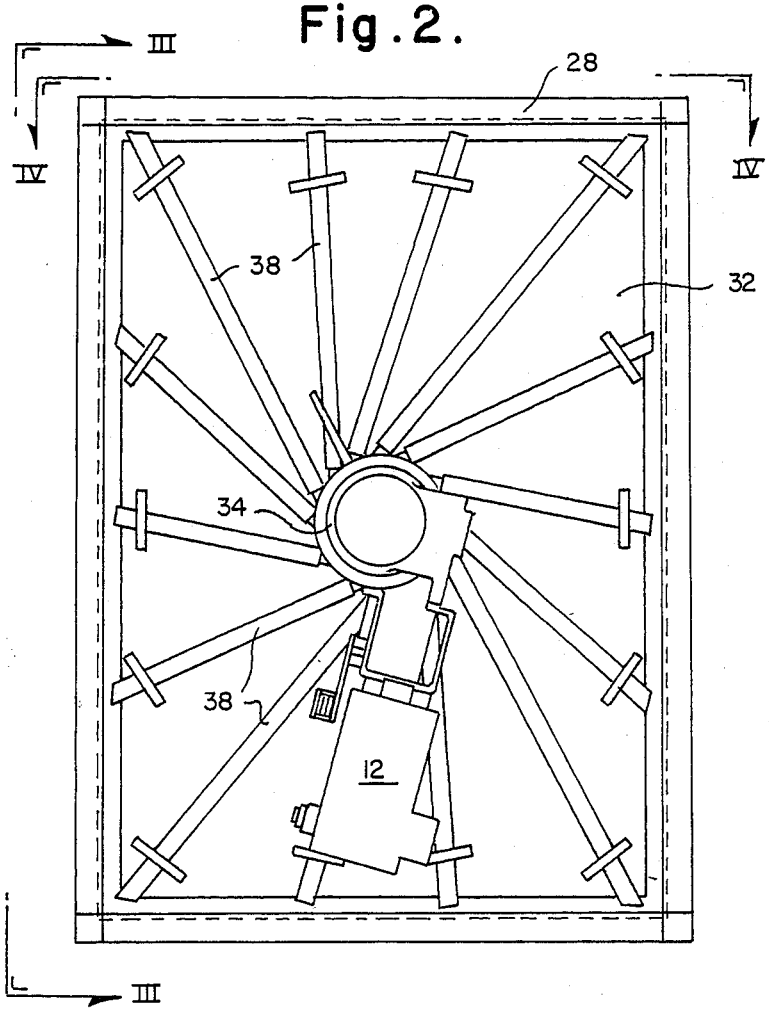

The apparatus 10 may be used in conjunction with a sterilization chamber 24 as shown in FIGS. 2 through 9. FIG. 2 is an end view of the sterilization chamber 24 and door 32 with the door in the closed and unlocked position while FIGS. 3 and 4 are side and top views, respectively, of the end of the sterilization chamber. FIG. 6 is an end view of the sterilization chamber 24 illustrating the door 32 in the closed and locked position while FIGS. 7 and 8 are side and top views, respectively, of the end of the sterilization chamber 24.

As shown in the figures, the sterilization chamber 24 has one end having an opening therein 26 for providing access to the interior of the chamber. The end of the chamber carries a chamber end ring 28 having a plurality of apertures 30 therethrough positioned along the perimeter of the opening 26.

The door 32 is sized to fit the opening 26. The door 32 rotatably carries a central locking wheel 34. A handle 36 may be attached to the central locking wheel 34 for rotation of same. A plurality of arms 38 are carried by the door 32 and connected to the central locking wheel 34 such that upon rotation of the locking wheeling 34 the arms 38 move radially to engage the plurality of apertures 30. In FIGS. 2 through 5, the door 32 is shown closed and unlocked. Thus, there is no engagement between the ends of the arms 38 and the apertures 30. In the closed and unlocked position, an angle theta ($\theta$), seen best in FIGS. 3 and 4, exists between the radially extending arms 38 and the flat surface of the door 32.

Upon rotation of the central locking wheel 34, the arms 38 begin to move radially outwardly so as to engage the plurality of apertures 30. Upon engagement, the door 32 is urged toward the chamber 24. The degree of engagement between the arms 38 and the apertures 30 determines the distance between the door 32 and the chamber 24. In FIGS. 6 through 9, the radial arms 38 are shown at the maximum point of engagement with the apertures 30 such that the angle theta is zero.

A seal or gasket 40 is carried by the door 32 and is positioned between the door 32 and the chamber end-ring 28. With a new gasket 40, it is anticipated that a seal of approximately thirty-five to forty pounds of pressure can be obtained with the radial arms 38 engaging the apertures 30 at some degree of engagement less than the maximum degree of engagement shown in FIGS. 6 through 9. Thus, the angle theta would have a value less than that shown in FIGS. 3 and 4 yet greater than that shown in FIGS. 7 and 8.

According to one embodiment, it has been found that in a sterilizer application the motor 12 draws twelve amperes when delivering a torque of approximately 2.8 ft.-lbs. which is mechanically transformed into a torque of forty ft.-lbs. acting upon the locking wheel 34. That provides the desired pressure (thirty to forty pounds) with which the gasket 40 must be urged against the chamber end-ring 28. Thus, the reference signal $V_{ref}$ is set at a value representative of twelve amperes. When the input signal $V_{in}$ equals the reference signal $V_{ref}$, the feedback signal $V_f$ changes state such that the control circuit 18 opens the contacts of the relay 16 to end the supply of current to the motor 12.

As time goes on and the gasket 40 seats and compresses with age and continued use, the radial arms 38 must engage the apertures 30 to a greater and greater extent to achieve the same degree of sealing. Thus, as can be seen, over time the angle theta gradually decreases. However, because the seal between the door 32 and chamber end-ring 28 is determined by the current drawn by the motor 12, and the current drawn by the motor 12 to cause the gasket 40 to be urged against the chamber end-ring with forty pounds of pressure remains constant, compression of the gasket 40 over time does not interfere with the proper operation of the apparatus 10. Thus, the apparatus 10 continually insures that the door 32 is sealed to the proper pressure regardless of the actual distance between the door 32 and the chamber end-ring 28 and regardless of the condition of the gasket 40. That represents a substantial advantage over the prior art.

The present invention is also directed to a method of insuring the closure of a chamber door, the chamber being of the type wherein the door is urged into engagement with the chamber upon rotation of a locking wheel. The chamber further has a seal positioned between the door and the chamber such that upon movement of the door toward the chamber the seal is compressed. The method is comprised of the following steps: supplying current to a motor; coupling torque from the motor to the locking wheel for urging the door toward the chamber; monitoring the current supplied to the motor to determine if a desired degree of pressure between the seal and the chamber has been achieved based on the amount of current drawn by the motor; and ending the supplying of current to the motor when the desired degree of pressure is achieved.

The apparatus and method of the present invention eliminate the need for limit switches. Thus, the setup time in the factory is reduced and service calls for resetting of the limit switches are eliminated. The present invention also reduces the heat generated in the motor by preventing the motor from running in a stalled condition. That will improve motor life and reliability.

While the present invention has been described in conjunction with an exemplary embodiment thereof, many modifications and variations will be readily apparent to those of ordinary skill in the art. This disclosure and the following claims are intended to cover all such modifications and variations.

What is claimed is:

1. Apparatus for sealing the door of a chamber, the chamber being of the type wherein the door is urged into engagement with the chamber upon rotation of a locking wheel, the chamber further having a seal positioned between the door and the chamber such that upon movement of the door toward the chamber the seal is compressed, said apparatus comprising:
   motor means for providing torque to the locking wheel for urging the door toward the chamber;
   means for supplying current to said motor means; and
   means for monitoring the current supplied to said motor means to determine if a desired degree of pressure between the chamber and the seal has been achieved based on the amount of current drawn by said motor means,
   said means for supplying current being responsive to said means for monitoring so as to end the supply of current to said motor means when said desired degree of pressure between the chamber and the seal is achieved.

2. The apparatus of claim 1 wherein said means for monitoring includes a current sensor for producing an input signal representative of the amount of current drawn by said motor means and includes a comparator responsive to said input signal and a reference signal for producing a feedback signal which is input to said means for supplying current.

3. The apparatus of claim 2 wherein said reference signal is representative of the amount of current needed for said motor means to deliver sufficient torque to establish a desired degree of pressure between the chamber and the seal of approximately forty pounds, and wherein said feedback signal changes state hen said input signal equals said reference signal.

4. A chamber having a door and an apparatus for sealing said door, comprising:
   a chamber having one end having an opening therein, said end having a plurality of apertures along the perimeter of said opening;
   a door sized to fit said opening of said chamber;
   a central wheel rotatably carried by said door:
   a plurality of arms carried by said door and connected to said central wheel such that upon rotation of said central wheel said plurality of arms move radially to engage said plurality of apertures, the degree of engagement being determinative of the distance between said door and said one end of said chamber;
   a seal positioned between said door and said one end, said seal being compressed as the distance between said door and said one end decreases;
   motor means for providing torque to said central wheel for urging said door toward said one end;
   means for supplying current to said motor means; and
   means for monitoring the current supplied to said motor means to determine if a desired degree of pressure between said seal and said one end of the chamber has been achieved based on the amount of current drawn by said motor means,
   said means for supplying current being responsive to said means for monitoring so as to end the supply of current to said motor means when the desired degree of pressure is achieved.

5. The chamber of claim 4 wherein said desired degree of pressure is achieved when said motor means draws approximately twelve amperes from said means for supplying current.

6. A method of sealing a door of a chamber, the chamber being of the type wherein the door is urged into engagement with the chamber upon rotation of a locking wheel, the chamber further having a seal positioned between the door and the chamber such that upon movement of the door toward the chamber the seal is compressed, said method comprising the steps of:
   supplying current to a motor;
   coupling torque from said motor to the locking wheel for urging the door toward the chamber;
   monitoring the current supplied to said motor to determine if a desired degree of pressure between the seal and the chamber has been achieved based on the amount of current drawn by said motor; and.
   ending the supplying of current to said motor when the desired degree of pressure is achieved.

* * * * *

UNITED STATES PATENT AND TRADEMARK OFFICE
CERTIFICATE OF CORRECTION

PATENT NO. : 4,891,910

DATED : January 9, 1990

INVENTOR(S) : Thomas G. Cook and Conrad J. Geibel, Jr.

It is certified that error appears in the above-identified patent and that said Letters Patent is hereby corrected as shown below:

Col. 2, line 66, after the word "closed", delete "a" and substitute therefor --and unlocked--.

Col. 2, line 67, delete "5" and substitute therefor --9--.

Col. 2, line 68, delete "unlocked" and substitute therefor --locked--.

Col. 3, line 31, delete "ref," and substitute therefor --ref.--.

Col. 6, line 8, delete "hen" and substitute therefor --when--.

Signed and Sealed this

Fourteenth Day of May, 1991

Attest:

HARRY F. MANBECK, JR.

Attesting Officer

Commissioner of Patents and Trademarks